United States Patent
Schilder et al.

(10) Patent No.: US 10,760,653 B2
(45) Date of Patent: Sep. 1, 2020

(54) TRANSMISSION DEVICE FOR A MOTOR VEHICLE

(71) Applicant: DAIMLER AG, Stuttgart (DE)

(72) Inventors: Tobias Schilder, Filderstadt (DE); Tobias Haerter, Stuttgart (DE); Klaus Riedl, Tübingen (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/461,049

(22) PCT Filed: Nov. 20, 2017

(86) PCT No.: PCT/EP2017/001360
§ 371 (c)(1),
(2) Date: May 15, 2019

(87) PCT Pub. No.: WO2018/114029
PCT Pub. Date: Jun. 28, 2018

(65) Prior Publication Data
US 2020/0063834 A1     Feb. 27, 2020

(30) Foreign Application Priority Data

Dec. 21, 2016  (DE) .......................... 10 2016 015 181
May 20, 2017   (DE) .......................... 10 2017 004 931

(51) Int. Cl.
*F16H 48/10* (2012.01)
*F16H 3/72* (2006.01)
(Continued)

(52) U.S. Cl.
CPC ......... *F16H 3/721* (2013.01); *F16H 61/0006* (2013.01); *F16H 48/11* (2013.01); *F16H 2063/005* (2013.01); *F16H 2200/2007* (2013.01)

(58) Field of Classification Search
CPC ............. F16H 48/10; F16H 2200/2035; F16H 2200/0034; F16H 2200/0021;
(Continued)

(56) References Cited

U.S. PATENT DOCUMENTS 4,229,996 A * 10/1980 Hildebrand ........... F16H 47/085
475/55
5,429,557 A *  7/1995 Beim ....................... F16H 3/46
475/282
(Continued)

FOREIGN PATENT DOCUMENTS

DE          69405202 T2    3/1998
DE          60025487 T2    8/2006
(Continued)

OTHER PUBLICATIONS

International Search Report dated Apr. 20, 2018 in related/corresponding International Application No. PCT/EP2017/001360.
(Continued)

*Primary Examiner* — Roger L Pang
(74) *Attorney, Agent, or Firm* — Patent Portfolio Builders PLLC

(57) ABSTRACT

A transmission device for a motor vehicle includes a final drive and a planetary gearset. The planetary gearset has a first transmission element formed by a first ring gear, which first transmission element has external teeth for introducing a drive torque, at least one second transmission element and at least one third transmission element, which is coupled to the final drive. The device also has a brake element for lockingly braking at least one of the transmission elements of the planetary gearset. The final drive is a planetary differential, which is arranged radially inside the planetary gearset and is arranged in a gearwheel level with the planetary gearset.

11 Claims, 2 Drawing Sheets

Figure 1:
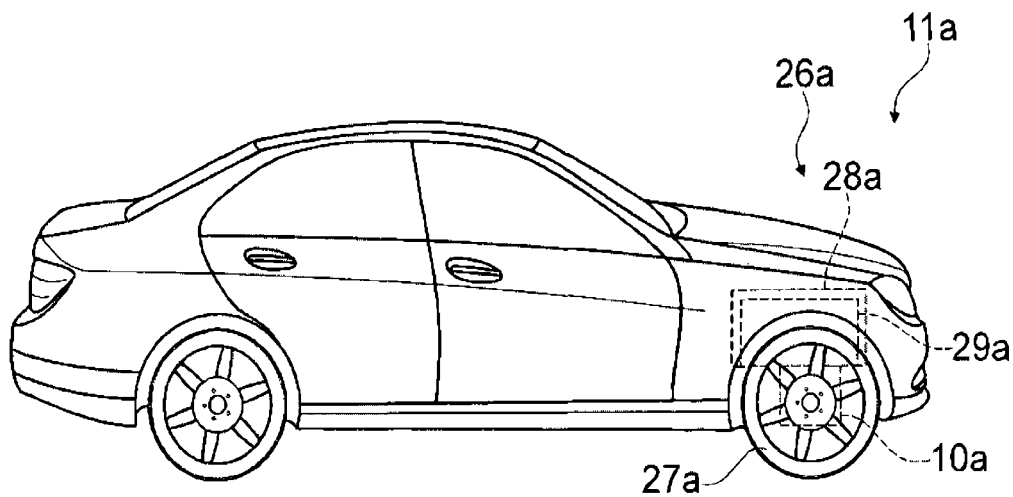

(51) Int. Cl.
*F16H 61/00* (2006.01)
*F16H 63/00* (2006.01)
*F16H 48/11* (2012.01)

(58) Field of Classification Search
CPC ......... F16H 2048/108; F16H 2003/442; F16H 3/54; F16H 48/11; F16H 2200/2007
USPC .................. 475/150, 204, 221, 903; 180/372
See application file for complete search history.

(56) References Cited

U.S. PATENT DOCUMENTS

| | | | |
|---|---|---|---|
| 5,554,080 | A | 9/1996 | Dangel |
| 5,919,111 | A * | 7/1999 | Park ........................ F16H 37/04 |
| | | | 475/269 |
| 7,384,357 | B2 | 6/2008 | Thomas et al. |
| 8,876,643 | B2 | 11/2014 | Fickel et al. |
| 2006/0100054 | A1 | 5/2006 | Maruyama et al. |
| 2010/0167862 | A1* | 7/2010 | Hoehn .................... F16H 48/36 |
| | | | 475/31 |
| 2015/0148177 | A1* | 5/2015 | Hwang ..................... F16H 3/66 |
| | | | 475/271 |

FOREIGN PATENT DOCUMENTS

| | | |
|---|---|---|
| DE | 102007021359 A1 | 3/2008 |
| DE | 102014215156 A1 | 2/2016 |
| DE | 102015104778 A1 | 9/2016 |
| JP | H05116549 A | 5/1993 |
| WO | 2011082707 A1 | 7/2011 |

OTHER PUBLICATIONS

Search Report created on Oct. 26, 2017 in related/corresponding DE Application No. 10 2017 004 931.9.
Written Opinion dated Apr. 20, 2018 in related/corresponding International Application No. PCT/EP2017/001360.

* cited by examiner

US 10,760,653 B2

TRANSMISSION DEVICE FOR A MOTOR VEHICLE

BACKGROUND AND SUMMARY OF THE INVENTION

Exemplary embodiments of the invention relate to a transmission device for a motor vehicle and to a motor vehicle comprising the transmission device.

A transmission device for a motor vehicle is known from DE 10 2015 104 778 A1, comprising: a final drive; a planetary gearset having at least one first transmission element formed by a ring gear, at least one second transmission element and at least one third transmission element; and at least one brake element for lock-braking at least one of the transmission elements of the planetary gearset.

A transmission device for a motor vehicle is known from generic DE 694 05 202 T2, comprising: a final drive; and a planetary gearset having a ring gear with external teeth for delivering a drive torque, at least one second transmission element and at least one third transmission element that is coupled to the final drive, the final drive being arranged radially inside the planetary gearset.

Furthermore, in transverse assemblies for motor vehicles, a final drive, in particular a ball differential, is generally integrated into a final drive wheel. This specifies that only one ratio is accommodated between a final drive pinion and the final drive. If a range group, for example, for a low range and a high range is integrated on the axle, this always occurs by means of a PTU connected downstream.

Exemplary embodiments are directed to advantageously and compactly accommodating an advantageous multispeed design into an existing installation space of the final drive and around the final drive.

According to an aspect of the invention, a transmission device for a motor vehicle comprises: a final drive; a planetary gearset having at least one first transmission element, which is formed by a first ring gear and has external teeth for delivering a drive torque, at least one second transmission element and at least one third transmission element that is coupled to the final drive; and at least one brake element for lock-braking at least one of the transmission elements of the planetary gearset. Preferably, the brake element is provided for lock-braking the second transmission element of the planetary gearset.

The "planetary gearset" should be understood to be, in particular, as a unit comprising a first sun gear, the first ring gear and at least one planet gear that is guided on a circular path around the sun gear by a first planet carrier.

According to an aspect of the invention, the final drive is designed as a planetary differential comprising a second ring gear, a second sun gear and a second planet carrier, which drive is arranged radially inside the planetary gearset and is arranged in a gearwheel plane with the planetary gearset.

The gearwheel plane is a plane arranged perpendicularly to the rotational axes of gears of the gearwheel plane. The gears belonging to the gearwheel plane are the first sun gear, the first ring gear, the planet gears of the first planet carrier, the second sun gear, planet gears of the second planet carrier, and the second ring gear. The rotational axes of the gears belonging to the gearwheel plane are arranged in parallel. The planetary differential being arranged in the gearwheel plane with the planetary gearset is a feature whereby the gearwheel plane intersects the first sun gear, the first ring gear, the planet gears of the first planet carrier, the second sun gear, planet gears of the second planet carrier, and the second ring gear.

This allows a very advantageous overall system consisting of a multispeed transmission comprising the planetary gearset, and the final drive. In particular, a multispeed design can be advantageously compactly accommodated into an existing installation space around the final drive. Particularly advantageously, a range group can be integrated upstream of the final drive, in particular into a final drive gear. Therefore, all gears can be reduced if necessary, which leads to higher output torques. In the crawl mode of operation, this is decisive for the engine operating points and cooling, for example. Furthermore, loading of the shift element can also be minimized. In particular, a PTU connected downstream can thus be omitted. Furthermore, installation space can be saved by a planetary differential being used instead of, for example, a ball differential, above and/or around which planetary differential a planetary gearset can advantageously be stacked. As a result, an advantageously compact design can be achieved. In this context, a "final drive" should be understood to be, in particular, a mechanism of a motor vehicle provided for transmitting a force of a drive unit of the motor vehicle to the axle of the drive wheels of the motor vehicle. Preferably, the final drive is provided for transmitting a force from the gearbox to the shaft of the drive wheels of the motor vehicle. Preferably, the final drive is formed by a differential gear, for example.

Advantageously, the planetary gearset has exactly one stationary ratio. Furthermore, a "brake element" in this context should be understood to be, in particular, a shift unit arranged so that it can act between a planetary gearset and a transmission housing, in particular between at least one transmission element of the planetary gearset and the transmission housing, and is provided for connecting, with a fixed rotational relationship, the rotatable coupling element thereof, which can be rotated independently of the transmission housing in an open state, to the coupling element thereof which is connected to the transmission housing with a fixed rotational relationship, in a closed state. Preferably, the rotatable coupling element is permanently connected to the transmission element of the planetary gearset with a fixed rotational relationship. "Connected with a fixed rotational relationship" should be understood to be, in particular, a connection in which a power flow, averaged over a complete rotation, is transmitted with an unadjusted rotational torque, an unadjusted rotational direction, and/or an unadjusted rotational speed. In this context, a "planetary differential" should be understood to be, in particular, a final drive, in particular a differential gear, which comprises at least one planetary gearset for transmitting a force of a drive unit of the motor vehicle to the axle of the drive wheels of the motor vehicle. Preferably, the planetary gearset is provided for transmitting a force from the gearbox directly to the shafts of the drive wheels of the motor vehicle. "Provided" should be understood to mean in particular specially programmed, designed and/or equipped. Since an object is provided for a particular function, it should in particular be understood that the object accomplishes and/or carries out this particular function in at least one application state and/or operating state.

According to an aspect of the invention, the transmission device comprises a locking element provided for interlocking at least two transmission elements of the planetary gearset. Preferably, the locking element is provided for interlocking exactly two transmission elements of the planetary gearset. Preferably, the locking element is formed by a clutch. Preferably, the locking element is formed by a clutch having at least one locking state. In particular, an advantageously compact arrangement of the transmission device with advantageous shiftability can thus be achieved. In particular, an advantageous multispeed design can be achieved. In this context, a "locking element" should be understood to be, in particular, a clutch having at least one locking state. In this context, a "clutch" should be understood to be, in particular, a shift unit arranged in a power flow between two planetary gearsets or between at least two transmission elements of the planetary gearset and provided for interconnecting the two rotatably mounted coupling elements thereof, which can be rotated independently of one another in an open state, with a fixed rotational relationship in a closed state. Preferably, every coupling element is, in each case, permanently connected to a transmission element with a fixed rotational relationship.

According to an aspect of the invention, the final drive is designed as a planetary differential comprising a double planet. Preferably, the planetary gearset of the planetary differential is therefore designed as a double planetary gearset. In particular, an advantageous final drive that is designed as a planetary differential can thus be provided.

According to an aspect of the invention, the third transmission element of the planetary gearset is formed by planet carriers and are permanently connected to the ring gear of the final drive with a fixed rotational relationship. In particular, an advantageously compact arrangement of the transmission device can thus be achieved. In particular, delivering torque to the final drive in an advantageous manner can thus also be achieved.

According to an aspect of the invention, the locking element is provided for interlocking the first transmission element, which is designed as a ring gear, of the planetary gearset and the third transmission element, which is designed as a planet carrier, of the planetary gearset. Preferably, a coupling element of the locking element is permanently connected to the first transmission element with a fixed rotational relationship and a coupling element of the locking element is permanently connected to the third transmission element with a fixed rotational relationship. Particularly advantageously, a ratio of i=1 can therefore be achieved by means of the planetary gearset. Preferably, the planetary gearset can therefore be advantageously bypassed.

The aim is also achieved by the brake element being provided for braking the second transmission element, which is designed as a sun gear, of the planetary gearset. For this purpose, the rotatable coupling element of the brake element is preferably permanently connected to the second transmission element with a fixed rotational relationship. In particular, an advantageous ratio can thus be achieved.

According to an aspect of the invention, the third transmission element of the planetary gearset is formed by a sun gear and is permanently connected to the ring gear of the final drive with a fixed rotational relationship. In particular, an advantageously compact arrangement of the transmission device is thus made possible. In particular, delivering torque to the final drive in an advantageous manner can thus be achieved. In particular, an advantageous arrangement of the final drive inside the sun gear can be achieved. An advantageously narrowly designed transmission device can thus be provided.

According to an aspect of the invention, the third transmission element of the planetary gearset is integral with the ring gear of the final drive. Preferably, the final drive, designed as a planetary differential, and the planetary gearset are arranged in a stack. Preferably, the third transmission element, which is in particular designed as a sun gear, and the ring gear of the final drive are a single gear. In particular, an advantageously compact arrangement of the transmission device is thus made possible. Furthermore, the number of components can therefore be minimized.

According to an aspect of the invention, the brake element is provided for braking the second transmission element, which is designed as a planet carrier, of the planetary gearset. In particular, an advantageous ratio can thus be achieved. In particular, a reversal of the rotational direction can be achieved. In particular, a mechanical reverse gear can thus be provided.

According to an aspect of the invention, the locking element is provided for interlocking the first transmission element, which is designed as a ring gear, of the planetary gearset and the third transmission element, which is designed as a sun gear, of the planetary gearset. Preferably, a coupling element of the locking element is permanently connected to the first transmission element with a fixed rotational relationship and a coupling element of the locking element is permanently connected to the third transmission element with a fixed rotational relationship. Particularly advantageously, a ratio of i=1 can therefore be achieved by means of the planetary gearset. Preferably, the planetary gearset can therefore be advantageously bypassed.

In this context, the terms "axial" and "radial" relate to a main rotational axis of the transmission device, and therefore the expression "axial" denotes, in particular, a direction extending in parallel with or coaxially to the main rotational axis. Furthermore, the expression "radial" hereinafter denotes, in particular, a direction that extends perpendicularly to the main rotational axis.

Combining the transmission device according to the invention with an electric motor in order to form an electric drivetrain is particularly advantageous. A particularly compact electric drivetrain results from the electric motor and the transmission device being arranged such that an electric motor output gear that is arranged coaxially to a rotor of the electric motor meshes with the external teeth of the first ring gear of the planetary gearset. The electric motor output gear is therefore advantageously arranged in the gearwheel plane with the planetary gearset and the final drive.

Further advantages can be found in the following description of the drawings. Two embodiments of the invention are shown in the drawings. The drawings, the description of the drawings and the claims contain numerous features in combination. A person skilled in the art will expediently also consider the features individually and combine them to form meaningful further combinations.

BRIEF DESCRIPTION OF THE DRAWING FIGURES

Figure 2:
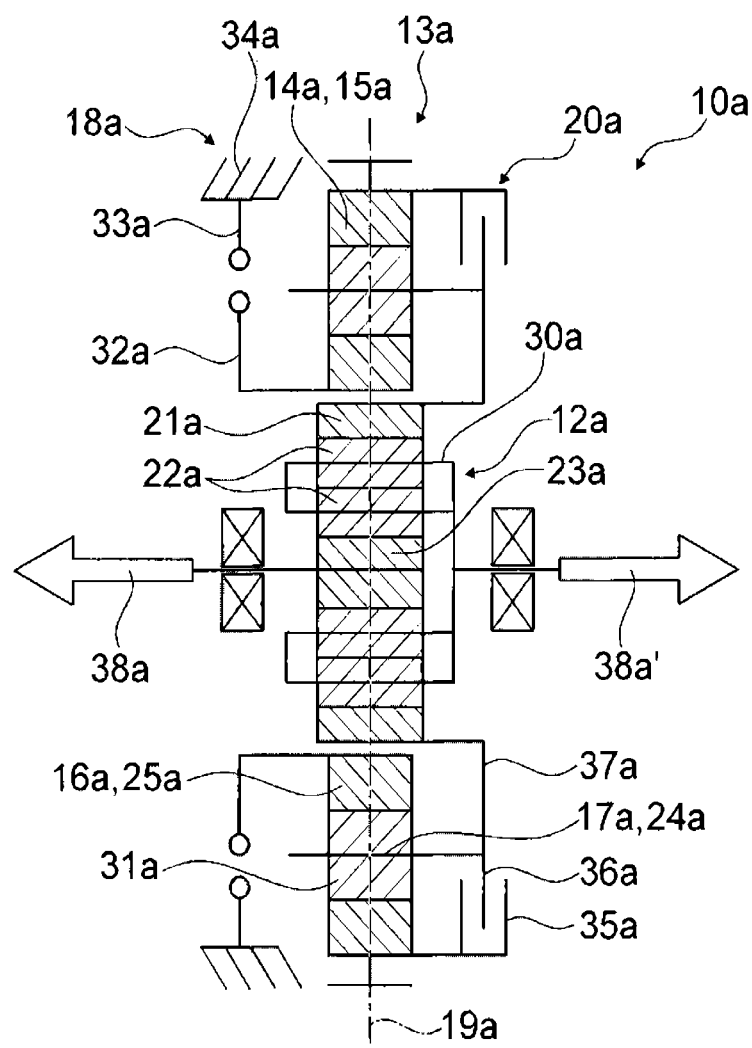
Figure 3:
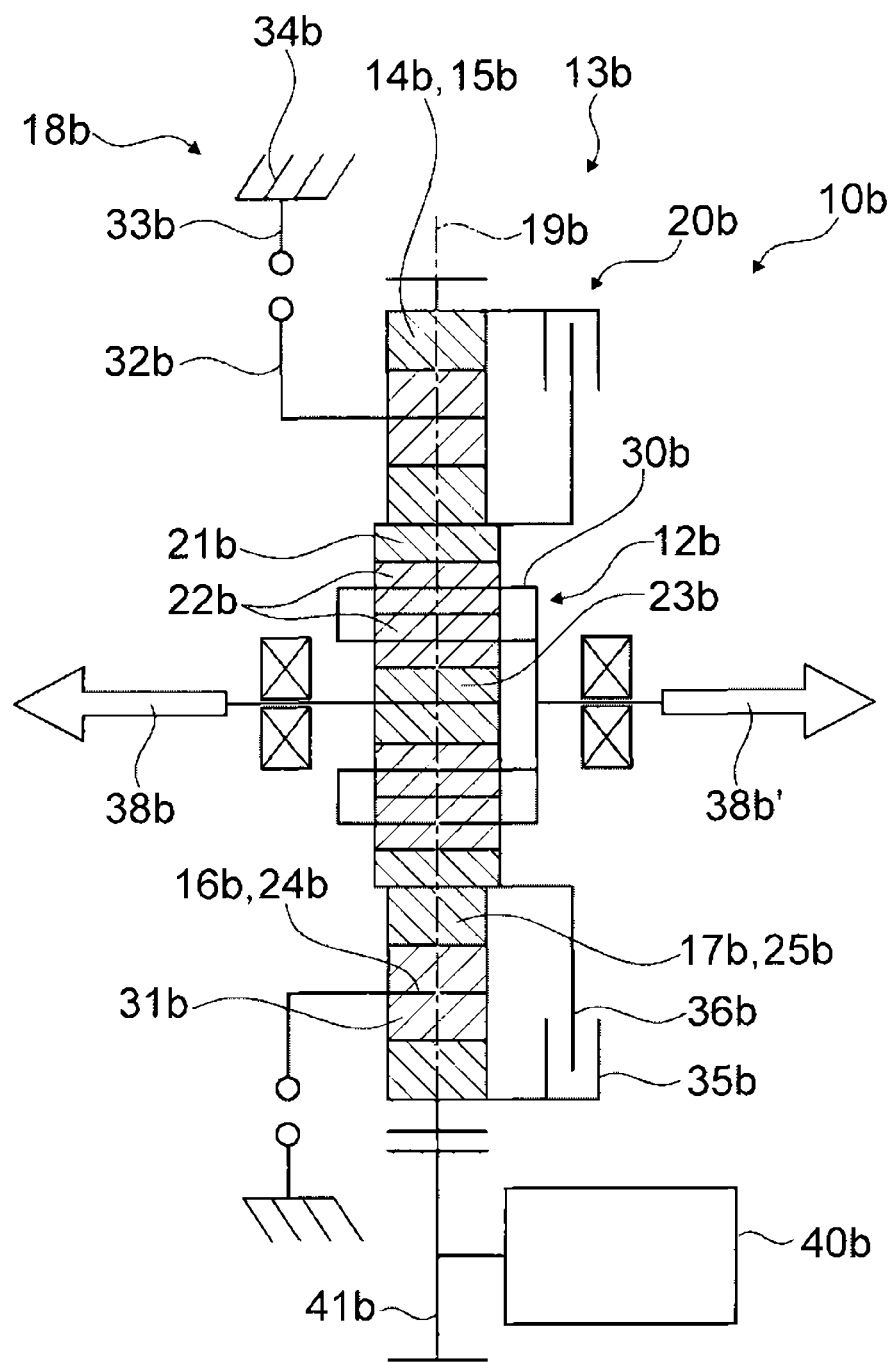

In the drawings:

FIG. 1 schematically shows a motor vehicle comprising a drive unit and a transmission device according to the invention, FIG. 2 schematically shows the transmission device according to the invention comprising a final drive, a planetary gearset, a brake element and a locking element and FIG. 3 schematically shows an alternative transmission device according to the invention comprising a final drive, a planetary gearset, a brake element and a locking element, combined with an electric motor in order to form an electric drivetrain.

DETAILED DESCRIPTION

FIG. 1 schematically shows a motor vehicle 11a. The motor vehicle 11a is, for example, a hybrid motor vehicle.

The motor vehicle 11a is, for example, a front-wheel drive motor vehicle 11a. The motor vehicle 11a comprises a drivetrain 26a by means of which drive wheels 27a of the motor vehicle 11a are driven (not shown in greater detail). The drivetrain 26a comprises a drive unit 28a. The drive unit 28a is formed by an internal combustion engine. The drive unit 28a is transversely mounted. The drivetrain 26a is transversely mounted. The drive unit 28a is mounted transversely to a specified straight direction of travel. The drive unit 28a comprises a driven crankshaft. The crankshaft extends perpendicularly to a specified straight direction of travel of the motor vehicle 11a. Furthermore, the drivetrain 26a comprises a multi-stage gearbox 29a and a transmission device 10a connected downstream of the multi-stage gearbox 29a.

The transmission device 10a comprises a final drive 12a and a planetary gearset 13a.

The planetary gearset 13a comprises three transmission elements 14a, 16a, and 17a. The planetary gearset 13a comprises a first transmission element 14a formed by a first ring gear 15a. The first transmission element 14a formed by the first ring gear 15a comprises external teeth for delivering a drive torque. The first transmission element 14a formed by the first ring gear 15a meshes with the multi-stage gearbox 29a by means of the external teeth (not shown in greater detail). The planetary gearset 13a also comprises a second transmission element 16a. The second transmission element 16a is formed by a first sun gear 25a of the planetary gearset 13a. The planetary gearset 13a additionally comprises a third transmission element 17a. The third transmission element 17a is formed by a first planet carrier 24a. The third transmission element 17a is coupled to the final drive 12a. For delivering torque, the third transmission element 17a, which is designed as the first planet carrier 24a, of the planetary gearset 13a is connected to the final drive 12a. The third transmission element 17a, which is designed as the first planet carrier 24a, of the planetary gearset 13a is connected directly to the final drive 12a.

The final drive 12a is coupled to the planetary gearset 13a on the output side. The final drive 12a is provided for transmitting a force, which is transmitted from the drive unit 28a to the transmission device 10a, to drive shafts 38a, 38a' of the drive wheels 27a of the motor vehicle 11a. The drive shafts 38a, 38a' are connected directly to the drive wheels 27a. The final drive 12a is formed by a differential gear. The final drive 12a is designed as a planetary differential that is arranged radially inside the planetary gearset 13a. The final drive 12a, which is designed as a planetary differential, is substantially arranged in a plane 19a with the planetary gearset 13a. The final drive 12a designed as a planetary differential and the planetary gearset 13a are arranged in a gearwheel plane. The final drive 12a designed as a planetary differential comprises a second ring gear 21a, a plurality of double planets 22a and a second sun gear 23a. The final drive 12a designed as a planetary differential also comprises a second planet carrier 30a. The double planets 22a are guided on a circular path around the second sun gear 23a by the second planet carrier 30a. The second sun gear 23a of the final drive 12a is permanently connected to the first drive shaft 38a with a fixed rotational relationship. The second planet carrier 30a of the final drive 12a is permanently connected to the second drive shaft 38' with a fixed rotational relationship (FIG. 2).

The third transmission element 17a, which is formed by the first planet carrier 24a, of the planetary gearset 13a is permanently connected to the second ring gear 21a of the final drive 12a with a fixed rotational relationship. The third transmission element 17a, which is designed as the first planet carrier 24a, of the planetary gearset 13a is permanently connected to the second ring gear 21a of the final drive 12a with a fixed rotational relationship by means of a connection element 37a. The planetary gearset 13a also comprises a plurality of planet gears 31a that are guided on a circular path around the second transmission element 16a, which is designed as the first sun gear 25a, by the third transmission element 17a, which is designed as the first planet carrier 24a. Each of the planet gears 31a meshes with the second transmission element 16a, which is designed as the first sun gear 25a, and with the first transmission element 14a, which is designed as the first ring gear 15a. The planetary gearset 13a is advantageously formed by a simple planetary gearset. However, it is, in principle, also conceivable that the planetary gearset 13a is formed by a double planetary gearset. In particular a ratio step-up could be achieved by a double planetary gearset. This would also allow for ratios of from i=0.3 to 0.75 in a braked state.

The transmission device 10a also comprises a brake element 18a. The brake element 18a is formed by a shift unit. The brake element 18a is provided for lock-braking at least one of the transmission elements 14a, 16a, and 17a of the planetary gearset 13a. The brake element 18a is provided for braking the second transmission element 16a, which is designed as the first sun gear 25a, of the planetary gearset 13a. The brake element 18a is provided for lock-braking the second transmission element 16a that is designed as the first sun gear 25a. The brake element 18a also comprises a first, rotatable coupling element 32a that is permanently connected to the second transmission element 16a, which is designed as the first sun gear 25a, with a fixed rotational relationship. The brake element 18a also comprises a second coupling element 33a connected to a transmission housing 34a of the transmission device 10a with a fixed rotational relationship. When the brake element 18a is an open state, the first, rotatable coupling element 32a can be rotated independently of the transmission housing 34a and, when the brake element is a closed, is connected, with a fixed rotational relationship, to the second coupling element 33a that is connected to the transmission housing 34a with a fixed rotational relationship. The brake element 18a is designed as a jaw-type shift element. However, another embodiment that appears meaningful to a person skilled in the art is, in principle, also conceivable. In a braked state, in particular a ratio of from i=1.7 to i=1.25 can be achieved by means of the transmission device 10a.

The transmission device 10a additionally comprises a locking element 20a. The locking element 20a is provided for interlocking at least two transmission elements 14a, 16a, and 17a of the planetary gearset 13a. The locking element 20a is provided for interlocking the first transmission element 14a, which is designed as the first ring gear 15a, of the planetary gearset 13a and the third transmission element 17a, which is designed as the first planet carrier 24a, of the planetary gearset 13a. The locking element 20a is formed by a clutch. The locking element 20a comprises a first coupling element 35a permanently connected to the first transmission element 14a, which is designed as the first ring gear 15a, with a fixed rotational relationship, and a second coupling element 36a permanently connected to the third transmission element 17a, which is designed as the first planet carrier 24a, with a fixed rotational relationship. The second coupling element 36a is permanently connected to the connection element 37a with a fixed rotational relationship. The second coupling element 36a and the connection element 37a are designed as one part. The coupling elements 35, 36a of the locking element 20a can be connected and separated by means of an actuator. In principle, the locking element 20a can be coupled between any two transmission elements 14a, 16a, 17a of the planetary gearset 13a. In particular, an arrangement that saves as much space as possible and the desired rotational speed loads/torque loads in the open/closed state are decisive for the position. In a closed state of the locking element 20a, the transmission device 10a has a ratio of i=1.

In principle, it would be conceivable that the brake element 18a and the locking element 20a are shifted by means of the same actuator, such as by means of double-sided synchronization. Therefore, shifting, as in a manual transmission, would only be possible when there is no load.

The first ring gear 15a is connected to and integrated in the final drive wheel and can therefore be accommodated so as to take up almost no extra installation space. The first ring gear 15a substantially assumes the position of the final drive wheel. The first planet carrier 24a is used as an output and is rigidly coupled to the summation shaft of the planetary differential, i.e. the second ring gear 21a. The first sun gear 25a can be connected to the transmission housing 34a by means of the brake element 18a in order to constitute a ratio reduction. The planetary gearset 13a is bypassed for the i=1 operation by means of the locking element 20a, without causing any additional losses. Two gears can therefore be shifted, in particular powershifted according to an application of the shift element, in the final drive wheel.

FIG. 3 shows a further embodiment of the invention. The following descriptions are substantially restricted to the differences between the embodiments; reference can be made to the description of the first embodiment in FIGS. 1 and 2 with regard to identical components, features and functions. To differentiate between the embodiments, the letter a in the reference signs for the embodiment in FIGS. 1 and 2 is replaced by the letter b in the reference signs for the embodiment in FIG. 3. Reference can, in principle, also be made to the drawings and/or the description of the first embodiment in FIGS. 1 and 2 with regard to identically referenced components, in particular with regard to components with the same reference signs.

FIG. 3 shows a transmission device 10b. The transmission device 10b comprises a final drive 12b and a planetary gearset 13b. The final drive 12b is coupled to the planetary gearset 13b on the output side. The final drive 12b is designed as a planetary differential that is arranged radially inside the planetary gearset 13b. The final drive 12b designed as a planetary differential comprises a second ring gear 21b, a plurality of double planets 22b and a second sun gear 23b. The final drive 12b designed as a planetary differential also comprises a second planet carrier 30b.

The planetary gearset 13b comprises three transmission elements 14b, 16b, 17b. The planetary gearset 13b comprises a first transmission element 14b formed by a first ring gear 15b. The first transmission element 14b formed by the first ring gear 15b comprises external teeth for delivering a drive torque. The planetary gearset 13b also comprises a second transmission element 16b. The second transmission element 16b is formed by a first planet carrier 24b of the planetary gearset 13b. The planetary gearset 13b also comprises a plurality of planet gears 31b that are guided on a circular path around the second transmission element 16b, which is designed as the first sun gear 25b, by the second transmission element 16b, which is designed as the first planet carrier 24b. The planetary gearset 13b additionally comprises a third transmission element 17b. The third transmission element 17b is formed by the first sun gear 25b. The third transmission element 17b is coupled to the final drive 12b. For delivering torque, the third transmission element 17b, which is designed as the first sun gear 25b, of the planetary gearset 13b is connected to the final drive 12b. The third transmission element 17b, which is designed as the first sun gear 25b, of the planetary gearset 13b is connected directly to the final drive 12b. The third transmission element 17b, which is formed by the first sun gear 25b, of the planetary gearset 13b is permanently connected to the second ring gear 21b of the final drive 12b with a fixed rotational relationship. The third transmission element 17b of the planetary gearset 13b is integral with the second ring gear 21b of the final drive 12b. The final drive 12b designed as a planetary differential and the planetary gearset 13b are arranged in a stack. Preferably, the third transmission element 17b, which is designed as the first sun gear 25b, and the second ring gear 21b of the final drive 12b constitute a single gear. The planetary gearset 13b is formed by a simple planetary gearset. However, it would, in principle, also be conceivable that the planetary gearset 13b is formed by a double planetary gearset. In particular a ratio step-up could be achieved by a double planetary gearset. It would thus also be possible to achieve in particular ratios of from i=0.7 to 0.25 in a braked state.

The transmission device 10b also comprises a brake element 18b. The brake element 18b is formed by a shift unit. The brake element 18b is provided for lock-braking at least one of the transmission elements 14b, 16b, 17b of the planetary gearset 13b. The brake element 18b is provided for braking the second transmission element 16b, which is designed as the first planet carrier 24b, of the planetary gearset 13b. The brake element 18b is provided for lock-braking the second transmission element 16b, which is designed as the first planet carrier 24b. The brake element 18b comprises a first, rotatable coupling element 32b permanently connected to the second transmission element 16b, which is designed as the first planet carrier 24b, with a fixed rotational relationship. The brake element 18b also comprises a second coupling element 33b connected to a transmission housing 34b of the transmission device 10b with a fixed rotational relationship. In an open state of the brake element 18b, the first, rotatable coupling element 32b can be rotated independently of the transmission housing 34b and, when the element is a closed state, is connected, with a fixed rotational relationship, to the second coupling element 33b that is connected to the transmission housing 34b with a fixed rotational relationship. In a braked state, a reversal of the rotational direction and ratios of from i=−0.7 to i=−0.25 can be achieved by means of the transmission device 10b.

The transmission device 10b additionally comprises a locking element 20b. The locking element 20b is provided for interlocking at least two transmission elements 14b, 16b, and 17b of the planetary gearset 13b. The locking element 20b is provided for interlocking the first transmission element 14b, which is designed as the first ring gear 15b, of the planetary gearset 13b and the third transmission element 17b, which is designed as the first sun gear 25b, of the planetary gearset 13b. The locking element 20b is formed by a clutch. The locking element 20b comprises a first coupling element 35b permanently connected to the first transmission element 14b, which is designed as the first ring gear 15b, with a fixed rotational relationship and a second element 36b permanently connected to the third transmission element 17b, which is designed as the first sun gear 25b, with a fixed rotational relationship. In a closed state of the locking element 20b is, the transmission device 10b has a ratio of i=1.

A mechanical reverse gear can be realized by means of the transmission device 10b. Reversing the rotational direction is achieved by the possibility of coupling the second transmission element 16b, which is designed as the first planet carrier 24b, to the transmission housing 34b. It is particularly advantageous that the output occurs by means of the third transmission element 17b, which is designed as the first sun gear 25b, of the outer gearset, which is also simultaneously the second ring gear 21b of the final drive 12b. The coupling is thus particularly space-saving. Due to this variant, the reverse gear can be omitted in the basic gearbox, in particular in the multi-stage gearbox, and can be realized by shifting in the transmission device 10b. The locking element 20b can also be coupled between any two elements of the planetary gearset 13b in this case.

Advantageously, the transmission device 10b can, as shown in FIG. 3, be combined with an electric motor 40 in order to form an electric drivetrain for an electric vehicle, and, particularly advantageously, an electric motor output gearwheel 41b arranged coaxially to a rotor (not shown) of the electric motor 40b is arranged such that it meshes with the external teeth of the first ring gear 15b and is arranged in the gearwheel plane 19b with the planetary gearset 13b and the final drive 12b. The electric motor can, of course, be combined with the embodiment in FIG. 2 in the same way.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 transmission device
11 motor vehicle
12 final drive
13 planetary gearset
14 transmission element
15 first ring gear
16 transmission element
17 transmission element
18 brake element
19 gearwheel plane
20 locking element
21 second ring gear
22 double planets
23 second sun gear
24 first planet carrier
25 first sun gear
26 drivetrain
27 drive wheel
28 drive unit
29 multi-stage gearbox
30 second planet carrier
31 planet gear
32 coupling element
33 coupling element
34 transmission housing
35 coupling element
36 coupling element
37 connection element
38 drive shaft
40 electric motor
41 electric motor output gearwheel

The invention claimed is:

1. A transmission device for a motor vehicle, the transmission device comprising:
   a final drive;
   a planetary gearset comprising
      at least one first transmission element formed by a first ring gear and external teeth configured to deliver a drive torque,
      at least one second transmission element, and
      at least one third transmission element coupled to the final drive; and
   at least one brake element configured to lock-brake at least one of the first, second, and third transmission elements of the planetary gearset, wherein the final drive is arranged radially inside the planetary gearset, and
   wherein the final drive is a planetary differential comprising a second ring gear, a second sun gear, and a second planet carrier and the final drive is arranged in a gearwheel plane with the planetary gearset.

2. The transmission device of claim 1, further comprising:
   a locking element configured to interlock at least two of the first, second, and third transmission elements of the planetary gearset.

3. The transmission device of claim 1, wherein the final drive is a planetary differential comprising a double planet.

4. The transmission device of claim 1, wherein the third transmission element of the planetary gearset is formed by a first planet carrier and is permanently connected to the second ring gear of the final drive with a fixed rotational relationship.

5. The transmission device of claim 2, wherein the locking element is configured to interlock the first transmission element, which is the first ring gear, of the planetary gearset and the third transmission element of the planetary gearset.

6. The transmission device of claim 1, wherein the at least one brake element is configured to brake the second transmission element, which is the sun gear, of the planetary gearset.

7. The transmission device of claim 1, wherein the third transmission element of the planetary gearset is formed by a first sun gear and is permanently connected to the second ring gear of the final drive with a fixed rotational relationship.

8. The transmission device of claim 7, wherein the third transmission element of the planetary gearset is integral with the second ring gear of the final drive.

9. The transmission device of claim 7, wherein the at least one brake element is configured to brake the second transmission element, which is the first planet carrier, of the planetary gearset.

10. The transmission device of claim 7, further comprising:
    a locking element configured to interlock at least two of the first, second, and third transmission elements of the planetary gearset, wherein the locking element is configured to interlock the first transmission element, which is the first ring gear, of the planetary gearset and the third transmission element, which is the first sun gear, of the planetary gearset.

11. An electric drivetrain, comprising:
a transmission device, comprising
a final drive;
a planetary gearset comprising
   at least one first transmission element formed by a first ring gear and external teeth configured to deliver a drive torque,
   at least one second transmission element, and
   at least one third transmission element coupled to the final drive; and
at least one brake element configured to lock-brake at least one of the first, second, and third transmission elements of the planetary gearset, wherein the final drive is arranged radially inside the planetary gearset, and
wherein the final drive is a planetary differential comprising a second ring gear, a second sun gear, and a second planet carrier and the final drive is arranged in a gearwheel plane with the planetary gearset; and
an electric motor, comprising an electric motor output gearwheel arranged coaxially to a rotor of the electric motor, that meshes with the external teeth of the first ring gear and that is arranged in the gearwheel plane with the planetary gearset and the final drive.

* * * * *